Patented Oct. 12, 1937

2,095,326

UNITED STATES PATENT OFFICE 2,095,326

ORGANIC ESTERS OF CELLULOSE AND METHOD OF MAKING SAME

Clifford I. Haney, Drummondville, Quebec, Canada, assignor to Celanese Corporation of America, a corporation of Delaware No Drawing. Application September 29, 1934, Serial No. 746,265

7 Claims. (Cl. 260—102)

This invention relates to chemically stabilized organic esters of cellulose and to the process of preparing same wherein the chemicals used are metallic salts and the time of treatment is just prior to or concurrent with precipitation of the cellulose ester from the ripening solution.

An object of the invention is the economic and expeditious production of stable organic esters of cellulose by a process of production that is shorter in time and requires less space and apparatus than when stabilizing precipitated cellulose esters by former methods. Other objects of the invention will appear from the following detailed description.

In the process of preparing organic esters of cellulose, the esterification of the cellulose is usually performed by treating the cellulose with an organic acid anhydride in the presence of an organic acid diluent or solvent for the ester of cellulose being formed and a catalyst such as sulphuric acid. After completion of the esterification of the cellulose, there results a homogeneous viscous solution and water may then be added in amounts sufficient to convert any organic acid anhydride remaining into the corresponding acid, whereupon usually after the addition of a certain quantity of water, the cellulose ester is permitted to hydrolyze or ripen to develop the desired solubility characteristics. Water and/or other non-solvent for the cellulose ester may then be added in sufficient amounts to precipitate the cellulose ester from solution. The cellulose ester is then washed and/or distilled to free it of acids as much as possible.

Thus in making cellulose acetate by the above method, the so-called solution method, cellulose is acetylated by means of acetic anhydride and a catalyst in the presence of large amounts of acetic acid which dissolves the cellulose acetate that is formed to produce a very heavy viscous solution. To this solution is added water, then it is allowed to stand until it develops the proper solubility characteristics. This solution after hydrolysis or ripening is usually streamed or poured into water which dilutes the acetic acid to such an extent that it is no longer capable of holding the cellulose acetate in solution, with the result that the cellulose acetate precipitates. However, since the solution of cellulose acetate is very viscous, the water acts on the particles or streams thereof to precipitate the outer layers of the same to produce a sort of case-hardening effect, with the result that included catalyst and reagents as well as impurities are only with difficulty removed by washing.

In place of adding the organic ester of cellulose solution to water, the water may be added to the solution with or without the aid of mechanical or inert gaseous agitators. Or other methods of precipitation may be employed and other precipitants than water may be used, although, even then, a certain amount of reagent and impurities are entrapped in the particles of cellulose ester.

The cellulose ester so formed contains sulphur in the form of various compounds which impair the stability of the cellulose ester and impart thereto the tendency of decomposing and discoloring. There may also be formed cellulose derivatives that tend to decompose and breakdown in the presence of the sulphur compounds.

By treating cellulose esters according to this invention the cellulose esters are made stable, have a high heat test, that is, they may be heated to a relatively high temperature without decomposing or charring, are clear and free from haze and have enhanced spinning properties. The cellulose esters produced by the method of this invention have a heat test from 10 to 20% higher than cellulose esters produced by non-chemical stabilizing means. The cellulose esters prepared according to this invention have a good spinning stability. Solutions thereof have excellent filtration properties, passing readily through the filtering media, and have the property of being able to be spun into filaments of low denier.

The organic esters of cellulose prepared according to this invention are exceptionally stable in the presence of light and industrial gases. The yarn and fabric made from filaments of cellulose esters prepared according to this invention are dyed evenly and to the same extent, by non-water soluble dyes, as the same type of materials prepared by other methods of stabilizing. Cellulose acetate that has been chemically stabilized may show a little more than normal resistance to delustering and saponification.

According to this invention organic esters of cellulose are stabilized by adding thereto suitable chemicals at the time of precipitation after ripening. Thus, while beating in the water necessary to precipitate the cellulose ester, after ripening, there is added a chemical such as basic aluminum acetate, sodium aluminate, sodium stannate and similar chemicals which chemicals are well dispersed through the gel or solution and when precipitation occurs enough of it is retained by the cellulose ester to promote stability since the contained chemicals react or combine with the impurities in the precipitated cellulose ester to form stable compounds. By this method the stabilizing reagent is carried to all parts of the particles of cellulose ester and its reaction is not limited to the surface of the particles. Other methods of precipitation may be employed, thus, the chemical stabilizing agent may be mixed with the ripened solution while or just prior to the pouring or extruding of same into a precipitating bath.

This invention may be employed in the making of any organic ester of cellulose that is used to form filaments, films, foils, plastics or lacquers. Examples of such organic esters of cellulose are cellulose acetate, cellulose formate, cellulose propionate and cellulose butyrate.

Cellulose in any suitable form, such as cotton, cotton linters, wood pulp prepared by either the sulphite or soda process, reconstituted cellulose etc., may be employed in making the cellulose esters. This cellulose may be activated by pretreatment with lower aliphatic acids or by treatment with alkali, etc. The esterifying agent may be acetic anhydride, formic acid, propionic anhydride or butyric anhydride, depending upon the ester of cellulose to be formed.

The esterification may be carried out in the presence of a suitable catalyst such as sulphuric acid, sodium bisulphate, methyl sulphate or a mixture of these with each other or with other catalysts, such as zinc chloride. While we prefer to employ acetic acid as the diluent or solvent for the cellulose ester to be formed, any other suitable organic acid may be employed such as propionic acid and butyric acid. The sulphur bearing acids and salts employed as catalyst are rearranged or broken down in the esterifying process and some of the sulphur present combines with the reagents present to form sulpho-acetates of cellulose. The sulpho-acetates of cellulose are difficult to remove and greatly decrease the stability of the final product obtained. Sulpho-cellulose compounds are also formed from sulphur compounds included in the anhydride and diluent used, which anhydride and diluent may have been used in the pretreating or esterification of previous batches of cellulose using sulphuric acid or sulphate salts as catalysts. The sulphur compounds are present in the anhydride or diluent due to the fact that the anhydride or diluent was converted or concentrated in the presence of sulphuric acid or sulphate salts as catalysts, or for the reason that the sulphuric acid or sulphate salts may have been present as impurities in the catalysts employed.

During the hydrolyzing or ripening period of the cellulose ester, there may be added to the ripening solution small quantities of inorganic salts as an aid in reducing the formation of unstable compounds. Examples of such salts are aluminum chloride and zinc chloride. In certain cases hydrochloric acid may be employed as an aid in reducing the formation of unstable compounds. The addition of such materials may permit of the reduction of the amount of the catalyst used in the esterification mixture and/or in the ripening solution.

The catalyst used in the esterification and ripening solution or mixture may be wholly or partially neutralized prior to the addition of the chemical stabilizing reagent. This reduces the amount of chemical stabilizing reagent required to form a stable cellulose ester, thus saving in amount of material used and preventing the inclusion of excessive amounts of the salts of the reagent remaining in the precipitated cellulose ester. Thus where a catalyst, such as sulphuric acid, is employed in the esterifying process, it may be neutralized by the addition of an alkali or alkaline salt, for example, the carbonate or bicarbonate of sodium or potassium or the ammonium salt of the organic acid employed as diluent or solvent.

The following salts may be used as chemical stabilizing agents: basic aluminum acetate, sodium aluminate, sodium acetate, a mixture of aluminum acetate, lime, acetic acid and aluminum sulphate, a mixture of zinc chloride and sodium acetate, a mixture of aluminum chloride and sodium acetate, calcium acetate, barium acetate, sodium stannate and similar salts. The amount of salt used may be substantially that amount required to theoretically combine with the sulphur present in the cellulose ester calculated as $SO_4$. However, two or three times the theoretical amount may be used. In the processes wherein sodium salts have been used either as a neutralizing agent for the catalyst or as a stabilizing agent, the cellulose ester should preferably be washed to remove any excess sodium compounds or readily soluble sodium compounds.

After addition of the salt to the solution of the cellulose ester, heat may be applied thereto prior to precipitation. Any degree of temperature may be employed from below room temperature to above the boiling point of the organic acid used as the solvent for the cellulose acetate.

For the purpose of describing the invention and not with the intention of being limited thereto there is given the following examples:

*Example I*

A solution of cellulose acetate ready for precipitation is mixed with basic aluminum acetate equal to twice the molecular equivalent of the sulphuric acid present. This solution is then heated for 3½ hours at around 80° C., the cellulose acetate is then precipitated.

The cellulose acetate is found to stand a heat test of 240° C., contains only 0.23% of sulphur figured as $SO_4$, is clear, has good spinning properties and has a slightly reduced viscosity.

*Example II*

Example I is repeated except that no heat is applied to the solution. Substantially the same results are reached except that the viscosity of the cellulose ester is substantially normal.

*Example III*

To a solution of cellulose acetate ready for precipitation is added a quantity of sodium aluminate equal to 1½ times the molecular equivalent of the sulphuric acid present. The solution is precipitated and washed.

The cellulose acetate thus prepared is stable and is found to have an ash content as low as 0.36% and has a very good heat test.

*Example IV*

To 600 parts of normal ripened cellulose acetate in solution is added 19 parts of sodium acetate to neutralize the sulphuric acid present. The temperature of the solution is raised to 99° C. There is then added to the solution 125 parts of zinc chloride dissolved in glacial acetic acid. The raised temperature is maintained for 4 hours. The solution is then cooled, precipitated and washed neutral.

A cellulose acetate having a good heat test and stability is obtained by this process. The cellulose acetate also has a low labile sulphur content and improved clarity with a slight lowering of viscosity.

Having described my invention what I desire to secure by Letters Patent is:

1. Method of preparing stable organic acid esters of cellulose, which comprises adding to a ripened cellulose ester in an organic acid solution containing an acidic sulphur-containing catalyst for the esterification of cellulose, a basic salt selected from the group consisting of the acetates of sodium, calcium, barium and aluminum and the stannate and aluminate of sodium, and then precipitating the cellulose ester from the solution, together with at least part of the basic salt.

2. Method of preparing stable cellulose acetate, which comprises adding to a ripened cellulose acetate in an organic acid solution containing an acidic sulphur-containing catalyst for the acetylation of cellulose, a basic salt selected from the group consisting of the acetates of sodium, calcium, barium and aluminum and the stannate and aluminate of sodium, and then precipitating the cellulose acetate from the solution, together with at least part of the basic salt.

3. Method of preparing stable cellulose acetate, which comprises adding to a ripened cellulose acetate in an organic acid solution containing an acidic sulphur-containing catalyst for the acetylation of cellulose, basic aluminum acetate, and then precipitating the cellulose acetate from the solution, together with at least part of the acetate.

4. Method of preparing stable cellulose acetate, which comprises adding to a ripened cellulose acetate in an organic acid solution containing an acidic sulphur-containing catalyst for the acetylation of cellulose, sodium aluminate, and then precipitating the cellulose acetate from the solution, together with at least part of the sodium aluminate.

5. Method of preparing stable cellulose acetate, which comprises adding to a ripened cellulose acetate in an organic acid solution containing an acidic sulphur-containing catalyst for the acetylation of cellulose, sodium stannate, and then precipitating the cellulose acetate from the solution, together with at least part of the sodium stannate.

6. Method of preparing stable cellulose acetate, which comprises ripening cellulose acetate in its acetylation solution containing an acidic sulphur-containing catalyst for the reaction, neutralizing the catalyst, adding to the solution sodium aluminate, and then precipitating the cellulose acetate from the solution.

7. Method of preparing stable cellulose acetate, which comprises ripening cellulose acetate in its acetylation solution containing an acidic sulphur-containing catalyst for the acetylation, neutralizing the catalyst, adding to the solution sodium stannate, and then precipitating the cellulose acetate from the solution.

CLIFFORD I. HANEY.